United States Patent [19]

Ma et al.

[11] Patent Number: 5,400,055

[45] Date of Patent: Mar. 21, 1995

[54] EXPANSIBLE NOTEBOOK COMPUTER

[76] Inventors: Hsi K. Ma; Chan-Ik Chung, both of 4F, No. 48, Sec. 2, Chung Cherng Rd., Taipei, Taiwan, Prov. of China

[21] Appl. No.: 162,655

[22] Filed: Dec. 6, 1993

[51] Int. Cl.$^6$ .............................................. G09G 3/02
[52] U.S. Cl. .................................. 345/168; 345/169; 345/901; 345/905; 364/708.1
[58] Field of Search ............... 345/168, 169, 901, 905; 364/708.1, 709.12

[56] References Cited

U.S. PATENT DOCUMENTS

| | | | |
|---|---|---|---|
| 4,978,949 | 12/1990 | Herron et al. | 345/168 |
| 5,038,308 | 8/1991 | Le et al. | 264/708.1 |
| 5,126,725 | 6/1992 | Yanagisawa | 345/168 |
| 5,126,954 | 6/1992 | Morita | 364/708.1 |
| 5,132,876 | 7/1992 | Ma | 364/708.1 |
| 5,159,533 | 10/1992 | Kuang | 364/708.1 |

Primary Examiner—Ulysses Weldon
Assistant Examiner—Matthew Luu
Attorney, Agent, or Firm—Bucknam and Archer

[57] ABSTRACT

An expansible notebook computer includes a mainframe unit, a display, and a keyboard unit, wherein the mainframe unit has a floppy diskdrive on the inside, a display connector connected to a mainframe connector on the display unit, a top recess, which receives the keyboard unit, a keyboard connector on the top recess electrically connected to a connector on the keyboard unit, a plurality of expansion cartridge connectors on a vertical front wall thereof for connecting an expansion cartridge, a plurality of mounting slots and a plurality of battery contacts on the vertical front wall above the expansion cartridge connectors for connecting a battery box, a hard diskdrive connector and an expansion box connector on a bottom wall thereof for connecting a hard diskdrive and an expansion box.

6 Claims, 3 Drawing Sheets

EXPANSIBLE NOTEBOOK COMPUTER

BACKGROUND OF THE INVENTION

The present invention relates to an expansible notebook computer which can be alternatively arranged into different arrangements having different functions as desired.

A variety of portable personal computers have been disclosed, and have appeared on the market, among which notebook computers has become more and more popular for the advantage of high mobility. However, a notebook computer has limitations in function and data processing capacity, and therefore external peripheral equipment may be needed. When several external peripheral equipment are added to a notebook computer, the notebook computer becomes not portable, and the electrical connecting wires between the notebook computer and the peripheral equipment may be tangled.

SUMMARY OF THE INVENTION

The present invention has been accomplished to provide a notebook computer which eliminates the aforesaid problems. According to the preferred embodiment of the present invention, the notebook computer comprises a mainframe unit, a display, and a keyboard unit, wherein the mainframe unit comprises a floppy diskdrive on the inside, a display connector connected to a mainframe connector on the display unit, a top recess, which receives the keyboard unit, a keyboard connector on the top recess electrically connected to a connector on the keyboard unit, a plurality of expansion cartridge connectors on a vertical front wall thereof for connecting an expansion cartridge, a plurality of mounting slots and a plurality of battery contacts on the vertical front wall above the expansion cartridge connectors for connecting a battery box, a hard diskdrive connector and an expansion box connector on a bottom wall thereof for connecting a hard diskdrive and an expansion box. Therefore, several peripheral equipment can be added to the notebook computer in order.

DETAILED DESCRIPTION OF THE PREFERRED EMBODIMENT

Figure 1:
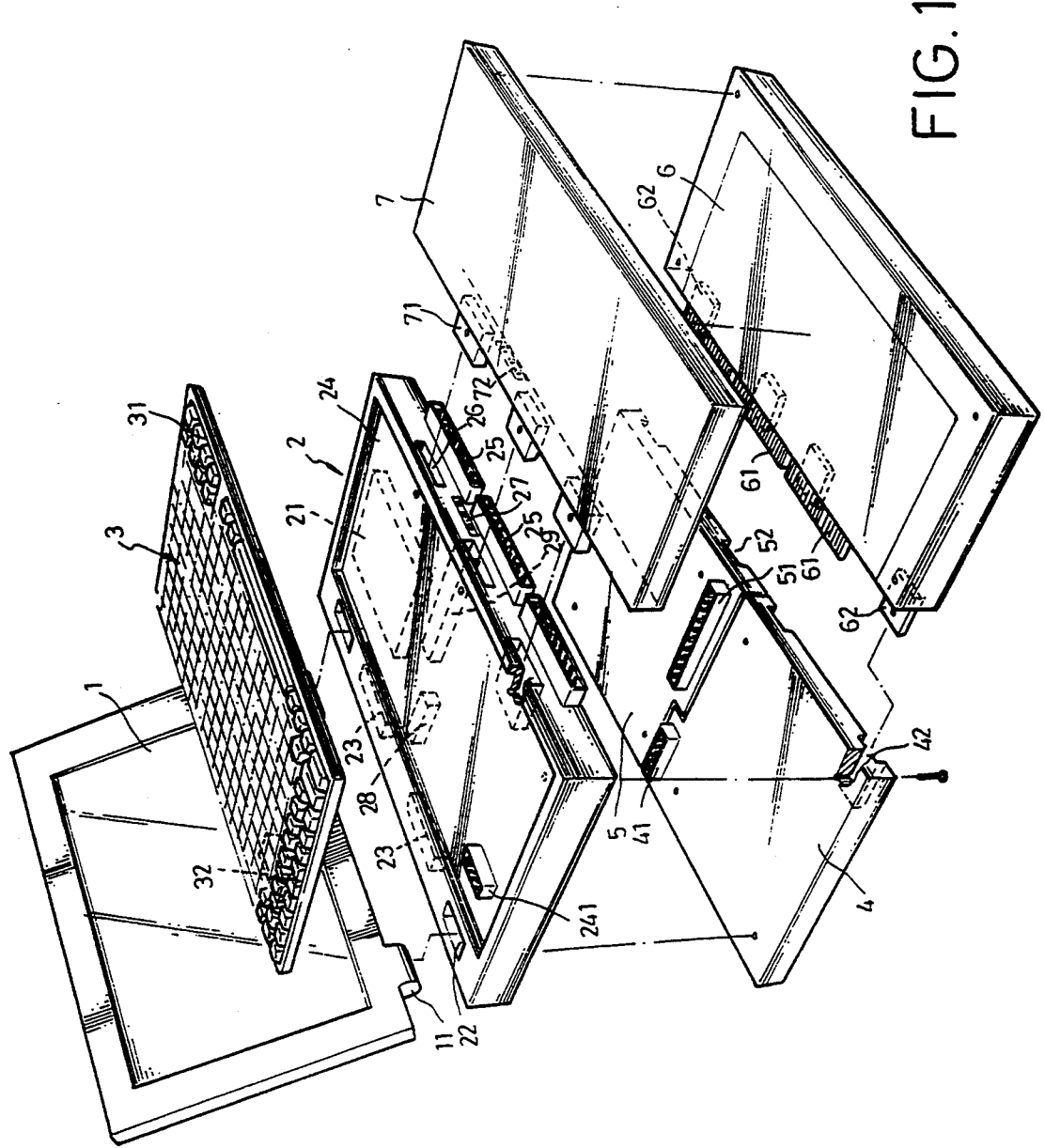
FIG. 1 is an exploded view of an expansible notebook computer according to the preferred embodiment of the present invention.

Turning now to the annexed drawings in detail and referring first to FIG. 1, an expansible notebook computer in accordance with the present invention is generally comprised of a display unit 1, a mainframe unit 2, a keyboard unit 3, a hard diskdrive unit 4, an expansion box 5, an expansion cartridge 6, and a battery box 7.

The display unit 1 is hinged to the mainframe unit 2, having a mainframe connector 11 electrically connected to the mainframe unit 2.

The mainframe unit 2 comprises a floppy diskdrive 21 on the inside, a display connector 22 connected to the mainframe connector 11 of the display unit 1, a plurality of I/O connectors 23 on a vertical back wall thereof, a top recess 24, which receives the keyboard unit 3, a keyboard connector 241 on the top recess 24 electrically connected to the keyboard unit 3, a plurality of expansion cartridge connectors 25 on a vertical front wall thereof, a plurality of mounting slots 26 and a plurality of battery contacts 27 on the vertical front wall above the expansion cartridge connectors 25 for connecting the battery box 7, a hard diskdrive connector 28 and an expansion box connector 29 on a bottom wall thereof for connecting the hard diskdrive unit 4 and the expansion box 5 respectively. Screw holes (not shown) may be made on the bottom wall of the mainframe unit 2 for permitting the hard diskdrive unit 4 and the expansion box 5 to be fastened to the mainframe unit 2 at the bottom by screws.

The keyboard unit 3 comprises a keyboard 31 fitted into the top recess 24 on the mainframe unit 2, a connector 32 on a bottom wall thereof electrically connected to the keyboard connector 241 on the mainframe unit 2.

The hard diskdrive unit 4 is made in width fitting over the mainframe unit 2, comprising a connector 41 electrically connected to the hard diskdrive connector 28 of the hard diskdrive unit 4, a plurality of mounting slots 42 on a vertical front wall thereof. Through holes may be made around the border of the hard diskdrive unit 4 for permitting the hard diskdrive unit 4 to be fastened to the mainframe unit 2 by screws.

The expansion box 5 is made in width fitting over the mainframe unit 2 at the bottom, comprising a connector 51 electrically connected to the expansion box connector 29 of the mainframe unit 2, and a plurality of mounting slots 52 on a vertical front wall thereof. Through holes may be made around the border of the expansion box 5 for permitting the expansion box 5 to be fastened to the mainframe unit 2 by screws.

The expansion cartridge 6 is made in length equal to the mainframe unit 2, comprising a plurality of connectors 61 on a vertical back wall thereof for electrically connecting to the expansion cartridge connectors 25 of the mainframe unit 2, a plurality of mounting rods 62. The mounting rods 62 are respectively fitted into the mounting slots 42;52 on the hard diskdrive unit 4 and the expansion box 5 when the connectors 61 are respectively connected to the expansion cartridge connectors 25. Through holes may be made around the border of the expansion cartridge 6 for permitting the expansion cartridge 6 to be fastened to the battery box 7 at the bottom by screws.

The battery box 7 is made in length equal to the mainframe unit 2, comprising a plurality of mounting rods 71 corresponding to the mounting slots 26 on the mainframe unit 2, and a plurality of contacts 72 corresponding to the battery contacts 27 of the mainframe unit 2. Screw holes may be made on the bottom wall of the battery box 7 for permitting the expansion cartridge 6 to be fastened to the battery box 7 at the bottom by screws.

Figure 2:
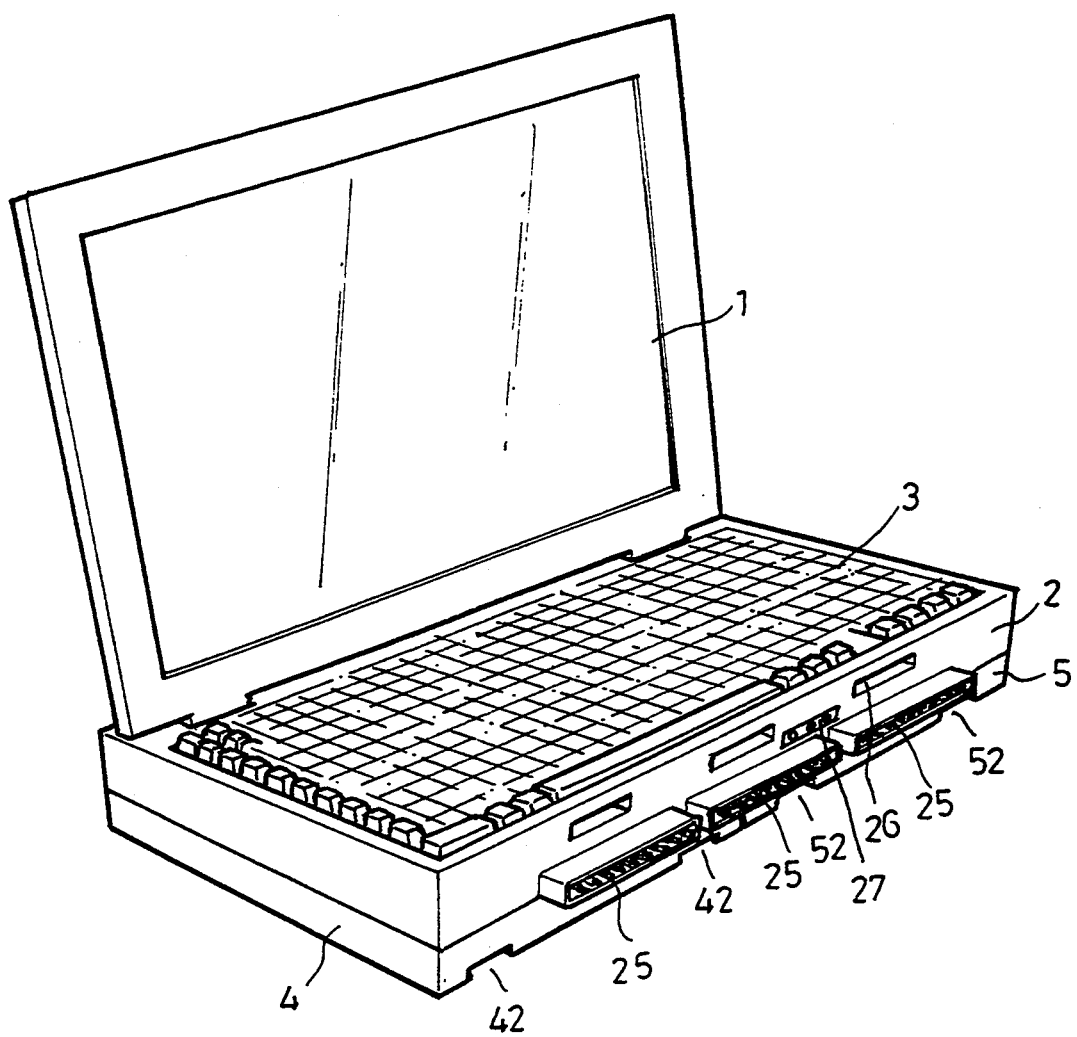
FIG. 2 shows the display unit, the keyboard unit, the mainframe unit, the hard diskdrive unit, and the expansion box of FIG. 1 connected together.
Figure 3:
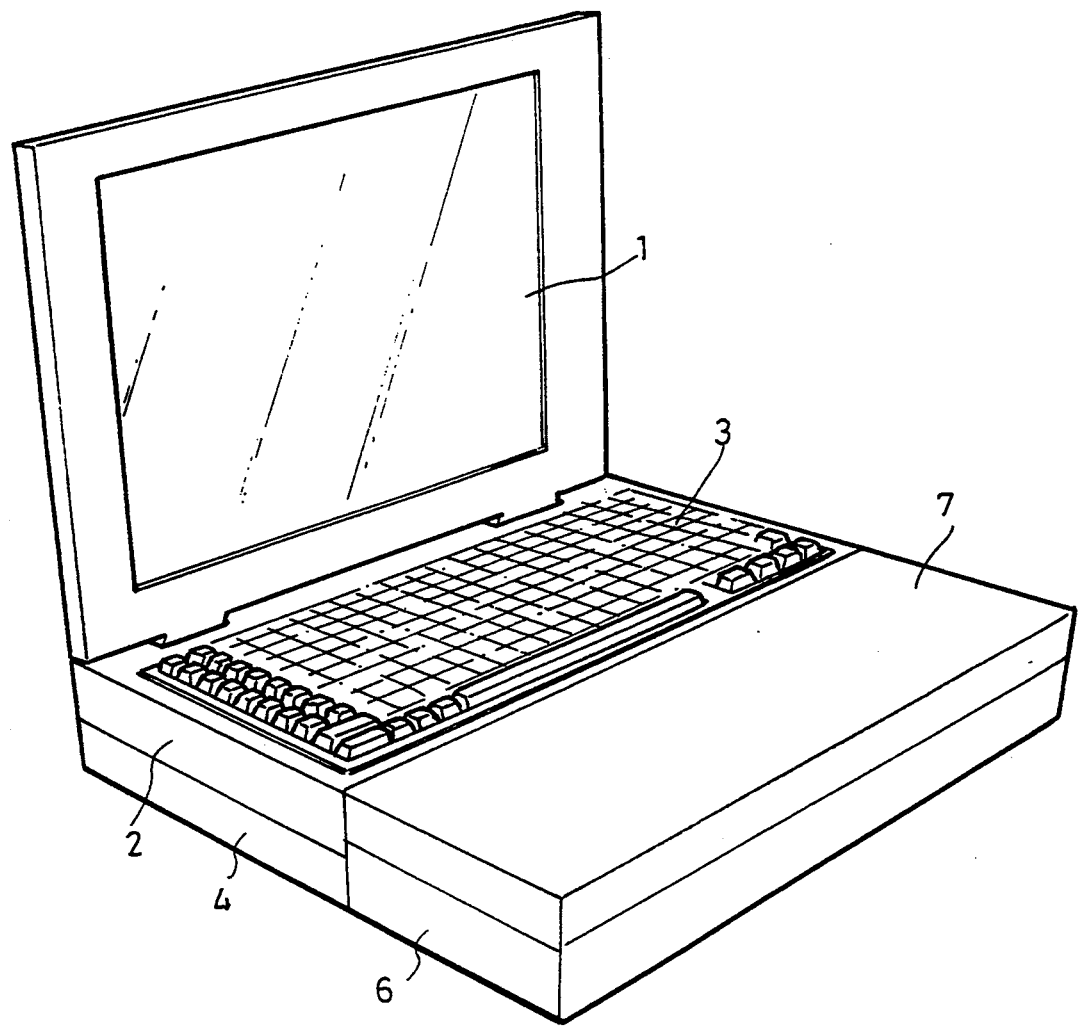
FIG. 3 shows the expansion cartridge and the battery box of FIG. 1 connected to the arrangement of notebook computer shown in FIG. 2.

Referring to FIGS. 2 and 3, the keyboard unit 3 is received within the top recess 24 on the mainframe unit 2 with the connector 32 of the keyboard unit 3 electrically connected to the keyboard connector 241 of the mainframe unit 2, and the display unit 1 is hinged to the mainframe unit 2 with the mainframe connector 11 of the display unit 1 electrically connected to the display connector 22 of the mainframe unit 2, and therefore the display unit 1, the mainframe unit 2, and the keyboard unit 3 are connected together and formed into a standard notebook computer. The hard diskdrive unit 4 and the expansion box 5 can then fastened to the mainframe unit 2 at the bottom by screws permitting the connectors 41;51 to be respectively connected to the hard diskdrive connector 28 and expansion box connector 29 of the mainframe unit 2, and therefore the hard diskdrive unit 4 and the expansion box 5 and the aforesaid standard notebook computer are combined together (see FIG. 2) to increase the storage function and data processing capacity of the notebook computer. The expansion cartridge 6 and the battery box 7 can then be added to the arrangement of notebook computer shown in FIG. 2 by fastening the expansion cartridge 6 to the battery box 7 at the bottom by screws and then fitting the mounting rods 62 of the expansion cartridge 6 into the mounting slots 42;52 on the hard diskdrive unit 4 and the expansion box 5 and the mounting rods 71 of the battery box 7 into the mounting slots 26 on the mainframe unit 2 permitting the connectors 61 of the expansion cartridge 6 to be respectively connected to the expansion cartridge connectors 25 of the mainframe unit 2 and the contacts 72 of the battery box 7 to be connected to the battery contacts 27 of the mainframe unit 2, and therefore a super notebook computer is formed as shown in FIG. 3.

The expansion cartridge 6 and the expansion box 5 are designed to provide different functions, for example: moden, FCSI, ether network, IC card, CD-ROM, and other expansion interface cards.

Furthermore, holes may be made through the mounting slots 26;42;52 and the mounting rods 62;71 for permitting the mounting rods 62;71 to be fixed in the mounting slots 26;42;52 by screws.

While only one embodiment of the present invention has been shown and described, it will be understood that various modifications and changes could be made without departing from the spirit and scope of the invention.

What is claimed is:

1. An expansible notebook computer consisting of a standard notebook computer comprised of a mainframe unit having input/output connectors, a keyboard mounted on said mainframe unit at the top and having key switches for data input into said mainframe unit, and a display unit hinged to said mainframe unit and controlled by said mainframe unit to present information in visual form, wherein said mainframe unit comprises a floppy diskdrive on the inside, a display connector connected to a mainframe connector on said display unit, a top recess, which receives said keyboard unit, a keyboard connector on said top recess electrically connected to a connector on said keyboard unit, a plurality of expansion cartridge connectors on a vertical front wall thereof, a plurality of mounting slots and a plurality of battery contacts on the vertical front wall above said expansion cartridge connectors for connecting a battery box, a hard diskdrive connector and an expansion box connector on a bottom wall thereof for connecting a hard diskdrive and an expansion box, and further comprising:

a) a hard diskdrive unit and an expansion box respectively connected to said mainframe unit at the bottom, said hard diskdrive unit comprising a connector electrically connected to the hard diskdrive connector of said mainframe unit and a plurality of mounting slots on a vertical front wall thereof, said expansion box comprising a connector electrically connected to the expansion box connector of said mainframe unit and a plurality of mounting slots on a vertical front wall thereof;

b) an expansion cartridge, said expansion cartridge comprising a plurality of connectors electrically connected to the expansion cartridge connectors of said mainframe unit, and a plurality of mounting rods respectively fitted into the mounting slots on said hard diskdrive unit and said expansion box; and c) a battery box, said battery box comprising a plurality of mounting rods respectively fitted into the mounting slots on said mainframe unit, and contacts electrically connected to the battery contacts of said mainframe unit.

2. The expansible notebook computer of claim 1 wherein said hard diskdrive and said expansion box are affixed to said mainframe unit by screws.

3. The expansible notebook computer of claim 1 wherein said battery box is affixed to said expansion cartridge by screws.

4. The expansible notebook computer of claim 1 wherein the mounting rods of said expansion cartridge are respectively fixed in the mounting slots of said hard diskdrive unit and said expansion box by screws.

5. The expansible notebook computer of claim 1 wherein the mounting rods of said battery box are respectively fixed in the mounting slots of said mainframe unit by screws.

6. The expansible notebook computer of claim 1, wherein said hard diskdrive unit, expansion box, expansion cartridge and battery box are detachably mounted to said mainframe unit.

* * * * *